M. S. ROBINSON.

CLAMP.

APPLICATION FILED APR. 30, 1913.

Reissued Nov. 11, 1913. 13,644.

Witnesses:

W. A. Heckman

Fred P. Staub

Inventor:

Milland S. Robinson by C. M. Clarke

COLUMBIA PLANOGRAPH CO., WASHINGTON, D. C.

UNITED STATES PATENT OFFICE.

MILLARD S. ROBINSON, OF DONORA, PENNSYLVANIA.

CLAMP.

13,644. Specification of Reissued Letters Patent. Reissued Nov. 11, 1913.

Original No. 1,010,075, dated November 28, 1911, Serial No. 634,944. Application for reissue filed April 30, 1913. Serial No. 764,715.

*To all whom it may concern:*

Be it known that I, MILLARD S. ROBINSON, a citizen of the United States, residing at Donora, county of Washington, State of Pennsylvania, have invented certain new and useful Improvements in Clamps, of which the following is a specification, reference being had therein to the accompanying drawing.

This invention relates to clamps especially designed for gripping and holding electrical conductors, conduits, rods, pipes and cables used in the electric equipment of railways and buildings, or for any other use to which the invention may be put.

The primary object of my invention is to provide a two-part clamp that can be easily and quickly placed in position to firmly grip and hold the cable, without impairing or injuring the same, and to engage it with gripping force proportioned to the strain.

A further object of the invention is to provide a sectional or two-part clamp with a novel one-piece clamping member adapted to cause the sections of the clamp to become more firmly bound upon the conductor as to weight of the conductor and the resulting pull or the pull of the clamp increases.

I attain the above objects by a construction showing a preferred arrangement, as hereinafter specifically described and claimed.

Figure 1:
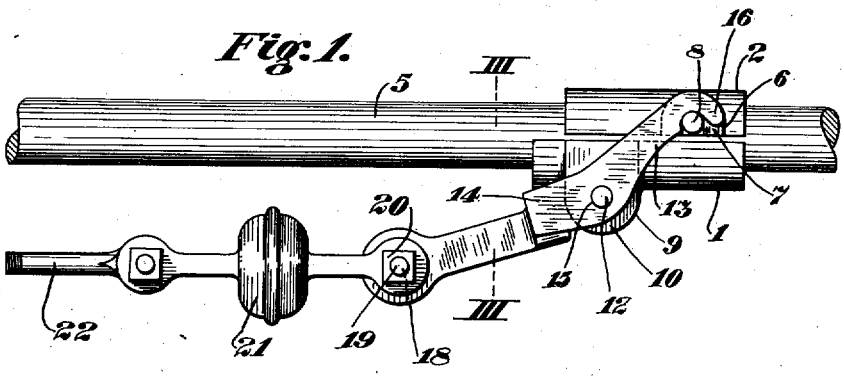
Figure 2:
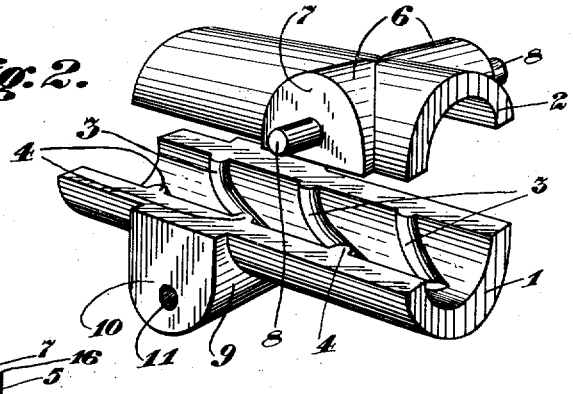
Figure 3:
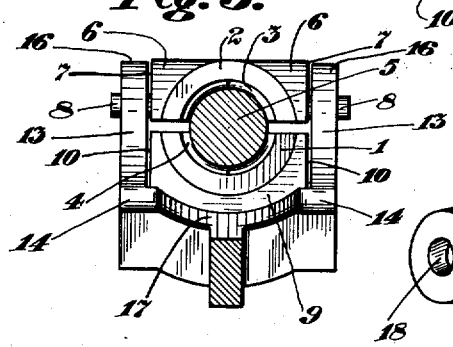
Figure 4:
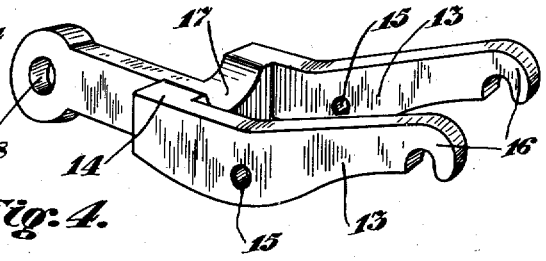

Referring to the drawings,—Figure 1 is a view of the clamp in side elevation, applied to a conductor or other similar element. Fig. 2 is an enlarged perspective view of the sections or jaws of the clamp, showing the same separated to better illustrate the construction. Fig. 3 is a cross sectional view of the clamp, showing it applied in gripping position on a conductor, indicated by the section line III. III. of Fig. 1. Fig. 4 is a detached enlarged perspective view of the clamping member.

The reference numerals 1 and 2 respectively denote semi-cylindrical jaws having the inner concave faces thereof provided with circumferentially arranged short ribs or beads 3 and 4, the ribs 3 being arranged in parallelism and staggered with relation to the ribs 4, with the ribs 3 curving toward one end of each jaw and the ribs 4 toward the opposite end, or otherwise as preferred. These ribs are adapted to frictionally engage the surface of a conductor 5, or other article being gripped, without injuring the same, the ribs preventing the jaws from shifting upon the conductor after being clamped in engagement therewith. The jaw 2 near one end thereof is provided with oppositely disposed boss extensions 6 arranged at right angles to said jaw and having the outer ends thereof provided with vertical faces 7 and pins 8 projecting outwardly from said faces. The jaw 1, adjacent to the opposite end thereof, is provided with a transverse boss enlargement 9, approximately corresponding in length to the combined length of the extensions 6. The ends of the enlargement 9 terminate in vertical faces 10 and said enlargement, as shown, is provided with a longitudinal opening 11. Mounted in the opening 11 is a pivot pin 12 for the side arms 13 of a clamping yoke member 14, preferably integral. The side arms are provided with openings 15 to receive the ends of the pin or pivoting members 12, and the outer ends of the arms are hook-shaped, as at 16 to engage over the pin members 8. The yoke member 14 is recessed, as at 17 to provide clearance for the end of the jaw 1, which is preferably of a greater length than the jaw 2. The member 14 has the rear end thereof apertured, as at 18. Pivotally connected to said member by a bolt 19 and a nut 20 or otherwise is an insulator 21 of the ordinary and well known type, when the clamp is used with a charged conductor. The opposite end of this insulator is pivotally connected to an eye bolt 22 or to any other suitable support, as a cable or hanger. When the clamp is used with an ordinary cable, the insulator 21 may be omitted. The pin 12 serves as a fulcrum at each of its ends for the openings 15 of member 14 and the greater the pressure brought to bear upon the jaw 1, by the pull of the cable 5 or connection 22, the greater is the pressure brought to bear upon the conductor 5 by the jaw 2, consequently the conductor will be firmly clamped between the jaws and positively held. By this construction and arrangement of the yoke 14, when the jaws are in gripping position, it will be seen that the side arms 13 of the yoke are arranged diagonally across the sides of the jaws, and that the pivoted engagement of the arms with the jaws and the backwardly sloping position of the rear end of the yoke and its connecting terminal 18 is such that the yoke operates as a lever under pulling strains. This effects a slight longitudinal movement of one jaw with relation to the other, and at the same time a closing of the jaws toward each other and into tight gripping engagement with the cable, due to the longitudinal off-setting of the pivoted yoke engagements and the arrangement of the yoke as a whole with relation to the line of strain longitudinally of the cable 5 and connection 22, due to the substantial parallelism of these two members.

While in the drawing there is illustrated a preferred embodiment of the invention, it is to be understood that the structural elements or details thereof are susceptible to such changes as fall within the scope of the appended claims.

What I claim is:

1. A clamp comprising a pair of cylindrical independent clamping jaws each provided on its inner face with two sets of circumferentially extending ribs, the ribs of each set arranged in parallelism and staggered with respect to the ribs of the other set, the ribs of one set curving toward one side of the jaw and the ribs of the other set curving against the opposite end of the jaw, said jaws being superposed with respect to each other, one of said jaws formed with a pair of laterally extending pins and the other of said jaws having a transversely extending opening, a clamping member having a central integral lever extension for connection with a pulling element and a pair of hook-shaped arms engaging with said pins for maintaining the jaws in superposed relation, and means extending through said opening for pivotally connecting the clamping member to that jaw having the opening.

2. A clamp consisting of oppositely arranged gripping jaws and a tightening lever therefor having arms arranged diagonally along the sides thereof and pivotally engaging diagonally opposite end portions of each jaw and having a centrally disposed lever extension deflected from the general direction of the lever arms.

3. A clamp consisting of oppositely arranged gripping jaws and a tightening lever therefor having integral side arm members arranged diagonally along the sides thereof and pivotally engaging diagonally opposite end portions of each jaw at each side thereof and having a centrally disposed lever extension deflected from the general direction of the lever arms.

4. A clamp consisting of oppositely arranged gripping jaws and a tightening lever therefor having integral side arm members arranged diagonally along the sides thereof and pivotally engaging diagonally opposite end portions of each jaw at each side thereof and having a lever extension arranged at an angle to the longitudinal center of the jaws and provided with a clearance opening at its inner side adjacent one of the gripping jaws.

5. A clamp consisting of oppositely arranged gripping jaws and a tightening lever therefor having side members arranged diagonally along the sides thereof and pivotally engaging diagonally opposite end portions of each jaw at each side thereof and having a single common lever extension disposed in the same general direction of the arms but deflected inwardly toward the jaws rearwardly thereof and provided with a connecting terminal for a tension member.

6. In a clamp, the combination of oppositely arranged gripping jaws each having side pivotal bearings at one end portion diagonally disposed with relation to the bearings of the other, and a tightening yoke lever having side arms provided with corresponding bearing portions engaging said pivotal bearings and a centrally disposed inwardly deflected actuating arm.

7. In a clamp, the combination of oppositely arranged gripping jaws each having side pivotal bearings at one end portion diagonally disposed with relation to the bearings of the other, and a tightening yoke lever having side arms provided with corresponding bearing portions engaging said pivotal bearings and an extended actuating arm disposed substantially in the direction of the side arms, but deflected inwardly thereof toward the adjacent jaw and provided with a clearance recess for the rounded end portion of said jaw.

8. In a clamp, the combination of oppositely arranged gripping jaws each having side pivotal bearings at one end portion diagonally disposed with relation to the bearings of the other, and a tightening yoke lever having side arms provided with corresponding bearing portions engaging said pivotal bearings and an integral extended centrally arranged actuating arm disposed substantially in the longitudinal direction of the side arms, but deflected inwardly thereof toward the adjacent jaw and provided with a clearance recess for the rounded end portion of said jaw, and provided with an attaching terminal for a pulling member.

9. In a clamp, the combination of oppositely arranged gripping jaws provided on their inner faces with series of alternating inclined ribs and each having side pivotal bearings at one end portion diagonally disposed with relation to the bearings of the other, and a tightening yoke lever having side arms provided with corresponding bearing portions engaging said pivotal bearings and an integral extended actuating arm deflected inwardly toward the central line of the jaws.

10. The combination with a cable or the like, of oppositely arranged gripping jaws engaging the cable substantially equidistantly at each side, one of said jaws having oppositely arranged pivotal bearings at one end portion, the other of said jaws having similar bearings at its end portion diagonally opposite thereto, a tightening yoke lever having side arms disposed diagonally across the sides of said jaws and pivotally engaging said bearings at each side and having an integral inwardly deflected rearwardly extending arm, and a pulling member connected to the terminal of said arm and disposed substantially in parallelism with the cable.

In testimony whereof I hereunto affix my signature in the presence of two witnesses.

MILLARD S. ROBINSON.

Witnesses:
C. M. CLARKE,
W. A. HECKMAN.

Copies of this patent may be obtained for five cents each, by addressing the "Commissioner of Patents, Washington, D. C."